United States Patent [19]

Schiller

[11] Patent Number: 4,685,145

[45] Date of Patent: Aug. 4, 1987

[54] CONVERSION OF AN IMAGE REPRESENTED BY A FIELD OF PIXELS IN A GRAY SCALE TO A FIELD OF PIXELS IN BINARY SCALE

[75] Inventor: Michael Schiller, Riverdale, N.Y.

[73] Assignee: Fingermatrix, Inc., North White Plains, N.Y.

[21] Appl. No.: 679,622

[22] Filed: Dec. 7, 1984

[51] Int. Cl.[4] ............................................. G06K 9/38
[52] U.S. Cl. ........................................ 382/52; 382/5; 382/54
[58] Field of Search ..................... 382/5, 50, 52, 54; 358/282, 284

[56] References Cited

U.S. PATENT DOCUMENTS

| 4,205,341 | 5/1980 | Mitsuya et al. | 358/284 |
| 4,322,163 | 3/1982 | Schiller | 356/71 |
| 4,323,974 | 4/1982 | Sekigawa | 382/52 |
| 4,398,256 | 8/1983 | Nussmeier et al. | 382/54 |

Primary Examiner—Leo H. Boudreau
Assistant Examiner—Jose L. Couso
Attorney, Agent, or Firm—McAulay, Fields, Fisher, Goldstein & Nissen

[57] ABSTRACT

A gray scale image of a fingerprint composed of a field of pixels is converted to a binary image composed of a field of pixels by a technique which takes into account the directivity of the ridge and valley structure. Three intermediate binary images are developed, one by the use of a vertical filter, one by the use of a horizontal filter and a reference image by the use of a filter which is not directionally biased. Corresponding subfields around each pixel in each of the three images are compared. If the subfield for the vertically derived image is closer to that of the reference image then is the subfield for the horizontally derived image, then the binary value for the pixel from the vertically derived image is used in the final image; and vice versa. In this fashion, a fourth a final binary image is derived from a combination of the vertically derived image and horizontally derived image which includes the best imagery from each of those two intermediate images.

21 Claims, 6 Drawing Figures

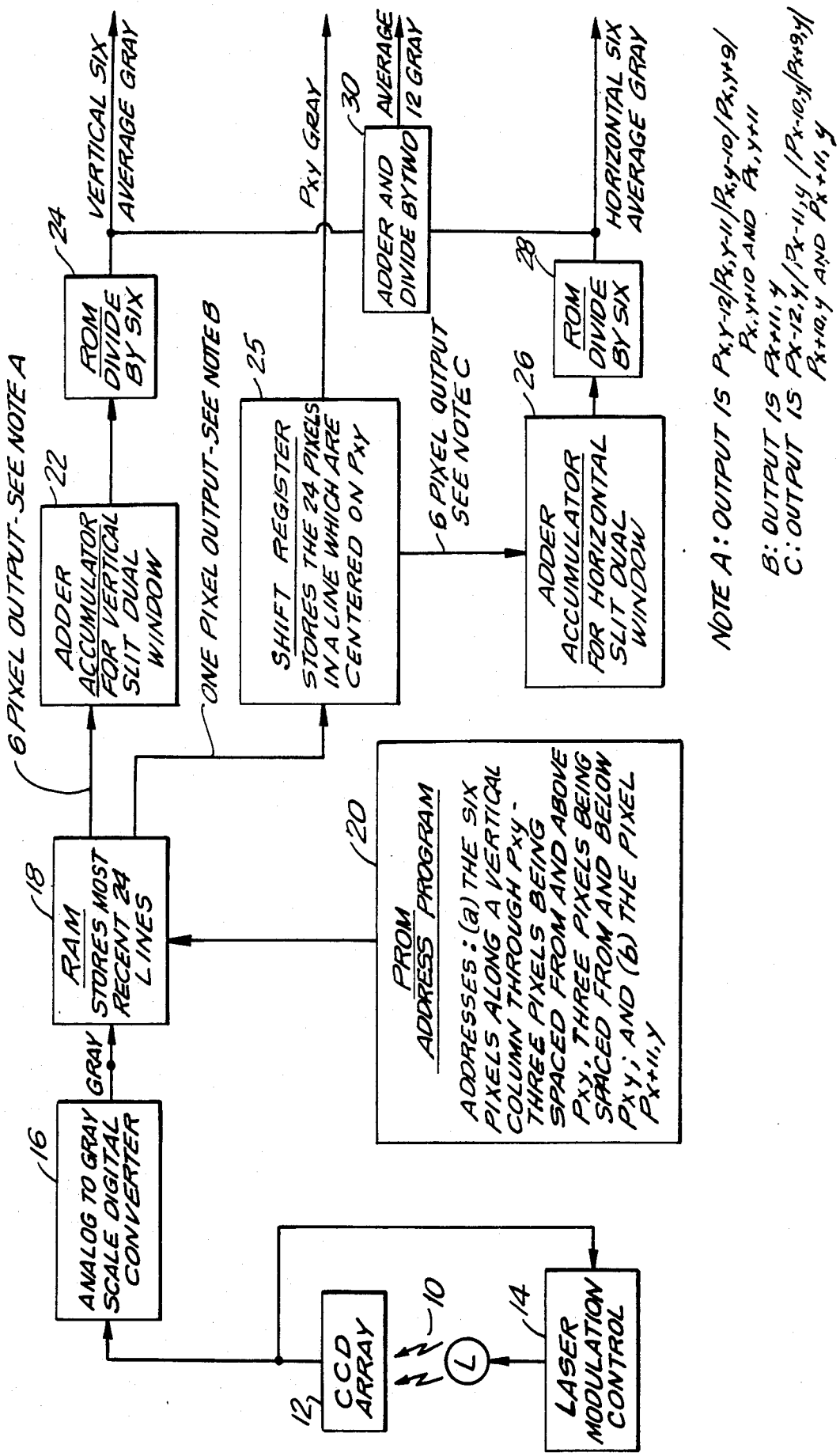
FIG.I-PART I

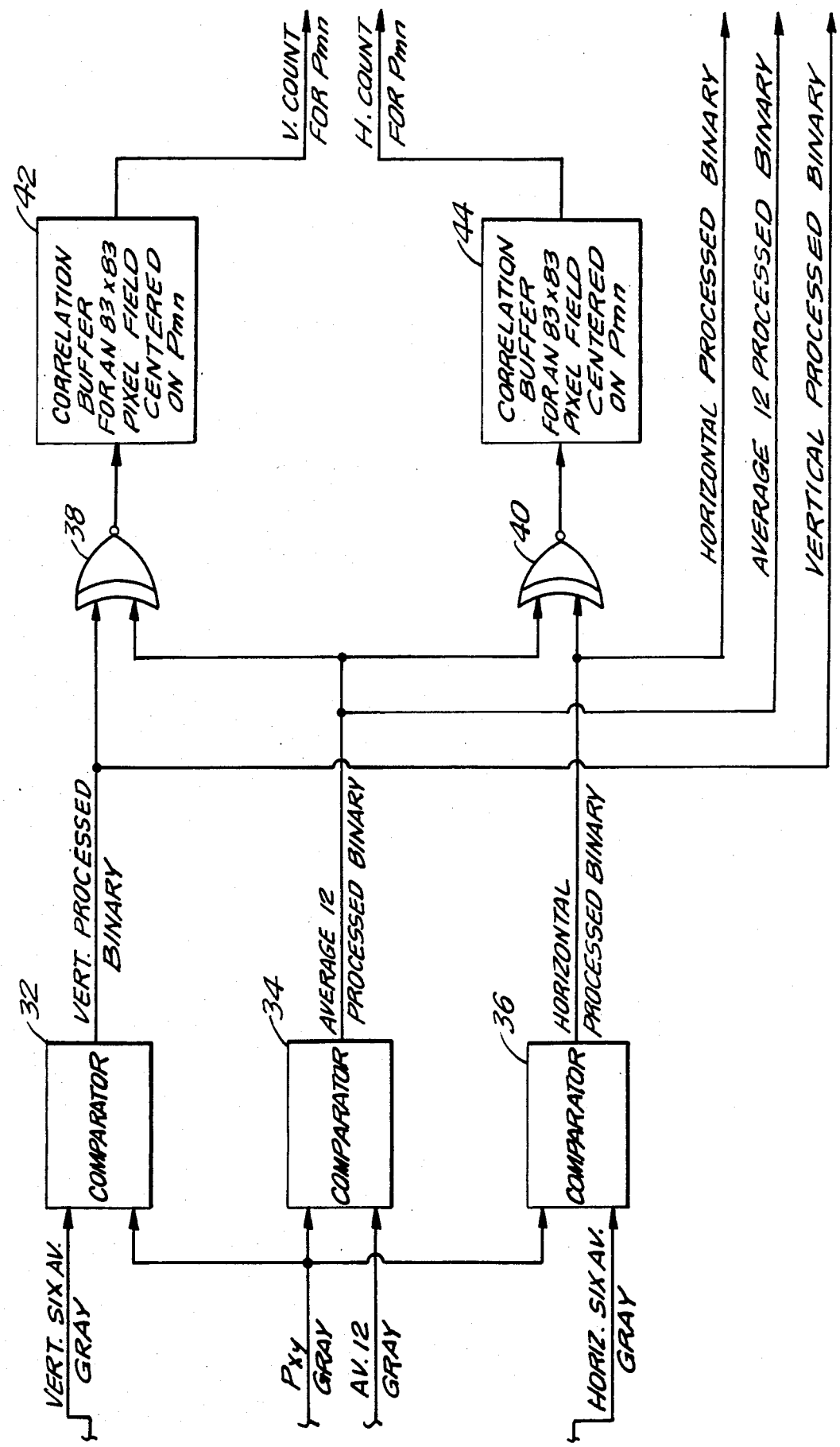
FIG.1-PART II

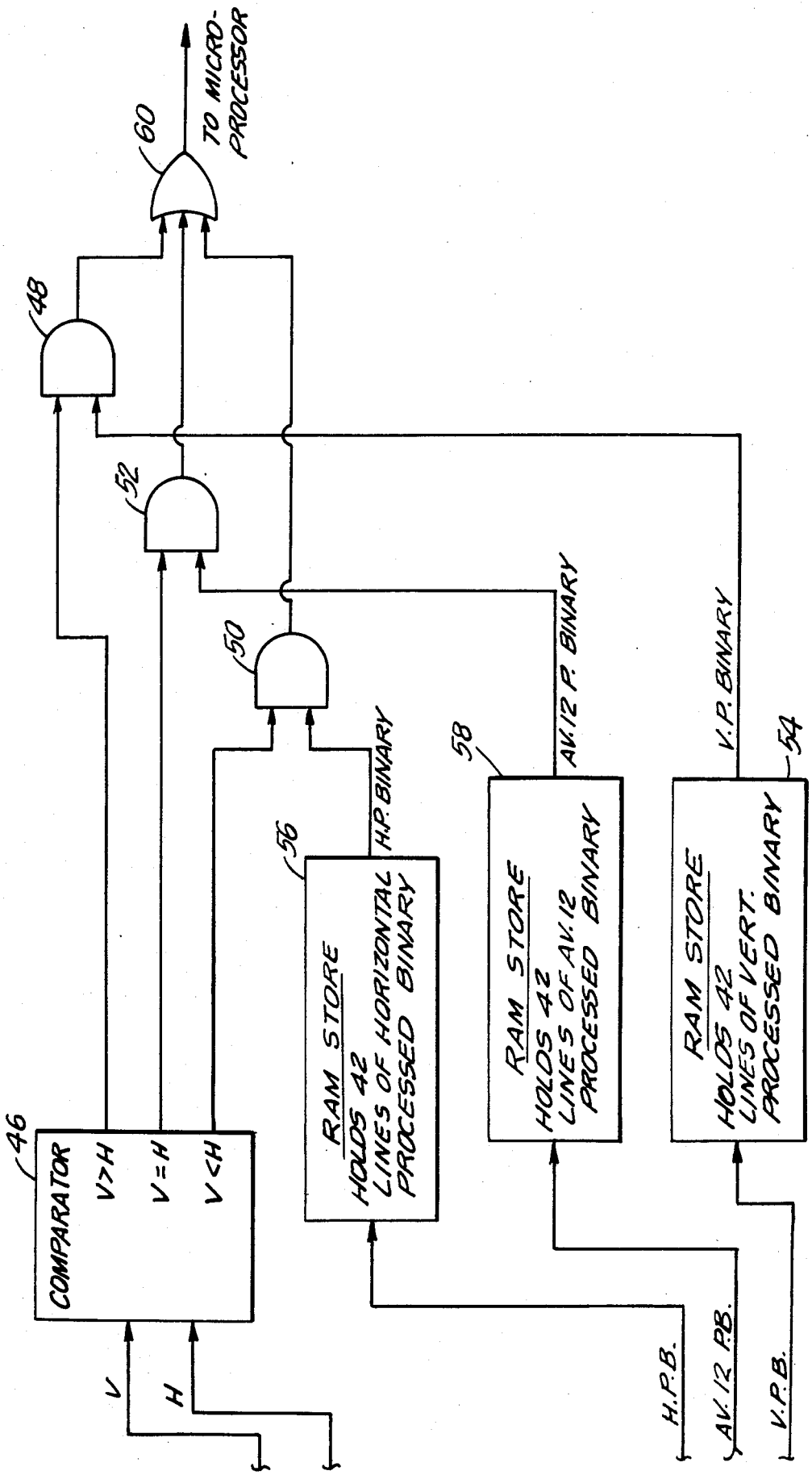
FIG.1-PART III

CONVERSION OF AN IMAGE REPRESENTED BY A FIELD OF PIXELS IN A GRAY SCALE TO A FIELD OF PIXELS IN BINARY SCALE

BACKGROUND OF THE INVENTION

This invention relates in general to a method of converting a gray scale pixel image to a binary pixel image. More particularly, it relates to an efficient method of obtaining an improved final binary pixel image of a fingerprint from a gray scale pixel image.

U.S. Pat. No. 4,322,163 issued on Mar. 30, 1982 describes the optical and mechanical components of a finger indentification system. As described therein, an optical scan of a subject finger placed against a platen provides a modulated relected light beam that is imaged at or near an array of photoelectric detectors.

The disclosure of the referenced patent is incorporated herein for the purpose of simplifying the description.

In order to process a fingerprint image in automatic processing equipment, the image must be such that each pixel has a binary value, one of which is a "white" or "one" value representing a ridge and the other of which is a "black" or "zero" value representing a valley. In order to have a reliable, useful access control or identification system, the binary fingerprint image obtained from the gray scale image must accurately reflect the ridges and valleys of the fingerprint itself. To obtain such an accurate image one must insure that the original fingerprint image is accurately converted to a gray scale image and that this gray scale image is accurately converted to a binary image. In addition to accuracy, the method for converting must be relatively inexpensive and quick. Clearly, the more accurate the binary image is the more reliable and useful will be either the access or the identification system.

Accordingly, it is a purpose of this invention to provide an improved method of accurately converting a gray scale image of a fingerprint to a binary image of the fingerprint.

It is a further purpose of this invention to provide such a method which is relatively inexpensive and which works quickly and efficiently.

BRIEF DESCRIPTION

In brief, in one embodiment of the present invention, an image of a fingerprint is represented by a field of pixels. Each pixel in the image has a gray scale value. To obtain a final fourth binary image of the fourth fingerprint, it is necessary to convert the gray scale value of each pixel to one of two contrasting values ("1" and "0" herein) which represent ridges and valleys. To obtain this improved final binary image, first, second and third intermediate binary images of the fingerprint are generated. These intermediate binary images are obtained by respectively scanning first, second and third predetermined mini-fields across the gray scale image. Both the first and second mini-fields are substantially elongated and have their major axes substantially orthogonal to one another. The third mini-field includes the areas of both the first and second mini-fields.

The binary value for each pixel in the first intermediate binary image is determined by positioning the first mini-field over each pixel in turn. The gray scale value for that pixel is compared against the average gray scale value of the pixels in the mini-field positioned over that pixel. The binary value "one" is assigned to the pixel if its gray scale value equals or exceeds the average gray scale value. Otherwise the vaue "zero" is assigned. The same procedure is followed to provide the binary value for the second and third intermediate binary images.

The first and second intermediate or provisional binary images thus provided are binary images based on a comparision of each pixel's gray scale value with the average gray scale value of first and second mini-fields respectively that are orthogonal to one another. For example, the first intermediate binary image is based on a comparison using a horizontal mini-field and the second intermediate binary image is based on a comparision using a vertical mini-field. By contrast, the third intermediate binary image does not have such a directional bias. It is a reference image against which the first and second images are compared.

The next step is to compare, by correlation of individual pixels, corresponding local areas of the first intermediate binary image and the reference intermediate binary image and also to compare by correlation of individual pixels, the same corresponding local area of the second binary image the reference binary image. Based on such correlations, a figure of merit or conformance is obtained which permits selecting either the binary value from the first intermediate binary image or from the second intermediate binary image as the binary value for the pixel in the final binary image. This comparison is preferably done on a pixel by pixel basis.

More particularly, a subfield is erected around corresponding pixels in each of the three intermediate binary images. The subfield is substantially larger than the mini-fields. Corresponding subfields from the first and reference image are correlated by determining the number of corresponding pixels in the two subfields which have the same value. This provides a correlation count for the pixel in the center of the subfield. A correlation count is obtained for each pixel in the first binary image. Similarly, a correlation count is obtained for each pixel in the second binary image by correlating such with the reference binary image. The binary value given to each pixel in the final binary image is selected from either the binary value for the corresponding pixel in the first intermediate binary image or from the binary value for the corresponding pixel in the second intermediate binary image. Which of those two are selected is determined by which pixel has the higher correlation count value. If the two count values are equal, the value of the pixel in the final image defaults to that of the reference image.

Thus a final image is provided in which the binary value of each pixel in the image is determined by which of two separate gray to binary conversions provides the better local image. These two gray to binary conversions have orthogonal directional biases.

The first intermediate binary image is developed from the use of a horizontal mini-field. It provides good definition of local ridge structure where ridge direction is predominantly vertical. But it provides poor definition of ridge structure where the underlying direction is predominantly horizontal. The key reason for this is that where the underlying structure is horizontal and the mini-field is horizontal, the average value under the mini-field will be equal or close to the value of the pixel $P_{xy}$ centered in that mini-field. Thus a determination of $P_{xy}$ binary value based on a comparison of the average gray scale value and the $P_{xy}$ gray scale value tends to be unreliable.

The second intermediate binary image is developed from the use of a vertical mini-field. This provides poor definition where local ridge structure is vertical and good definition where local ridge structure is horizontal. This is because where ridge structure is vertical, the average gray scale value of the vertical mini-field is too close to the Pxy gray scale value to provide a meaningful difference for the purpose of determining pixel binary color value.

The third or reference intermediate binary image, by contrast, is not derived with a directional bias. Accordingly, where ridge direction is more or less horizontal, the acuity of the reference intermediate binary image is better than that of the first intermediate binary image and poorer than that of the second intermediate binary image. Similarly, where ridge direction is more or less vertical, the acuity of the ridge direction developed in the reference binary image is better than that of the second intermediate binary image and poorer than that of the first intermediate binary image. As a consequence, in any local area, the acuity of the ridge definition of the reference image is intermediate between that of the first and second images. Thus, the reference image can be used to determine which of the first and second images is better within a local area. This is why the imagery in the final binary image is derived from either the first binary image or the second binary image. The determination as to which of those two binary images is used with respect to a given pixel is made by a comparison of corresponding local areas of the first and second binary images with the corresponding local area of the reference binary image.

In a presently perferred embodiment disclosed herein, the fingerprint image is a field of 1024×1024 pixels. The first and second mini-fields are defined by the outer pixels of two orthogonal elongate zones. Twenty-four adjacent pixels in a line define a horizontal zone 24 pixels long and one pixel wide. A vertical zone is defined by twenty-four pixels in a column. However, the first mini-field is determined only by the three outer pixels at each end by the horizontal zone, therefore providing a first mini-field of six pixels. Similarly, the second mini-field is the six pixels constituted by three outer pixels at the ends of the vertical zone. The third or reference mini-field is the sum of the first and second mini-fields.

BRIEF DESCRIPTION OF THE DRAWINGS

FIG. 1 is a block diagram of the overall system of one embodiment of this invention.

DESCRIPTION OF THE PREFERRED EMBODIMENT

The FIG. 1 Embodiment

Figure 2:
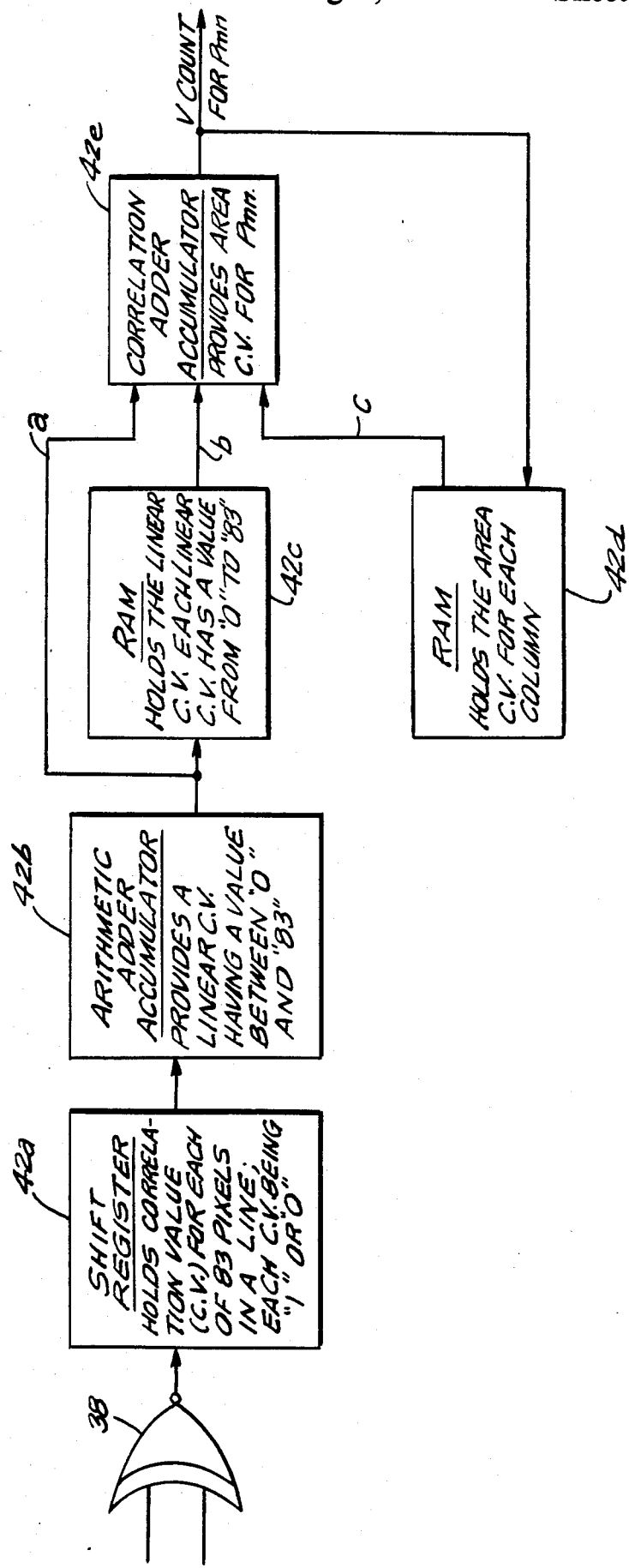
FIG. 2 is a more detailed block diagram of the correlation buffer 42 shown in FIG. 1.
Figure 3:
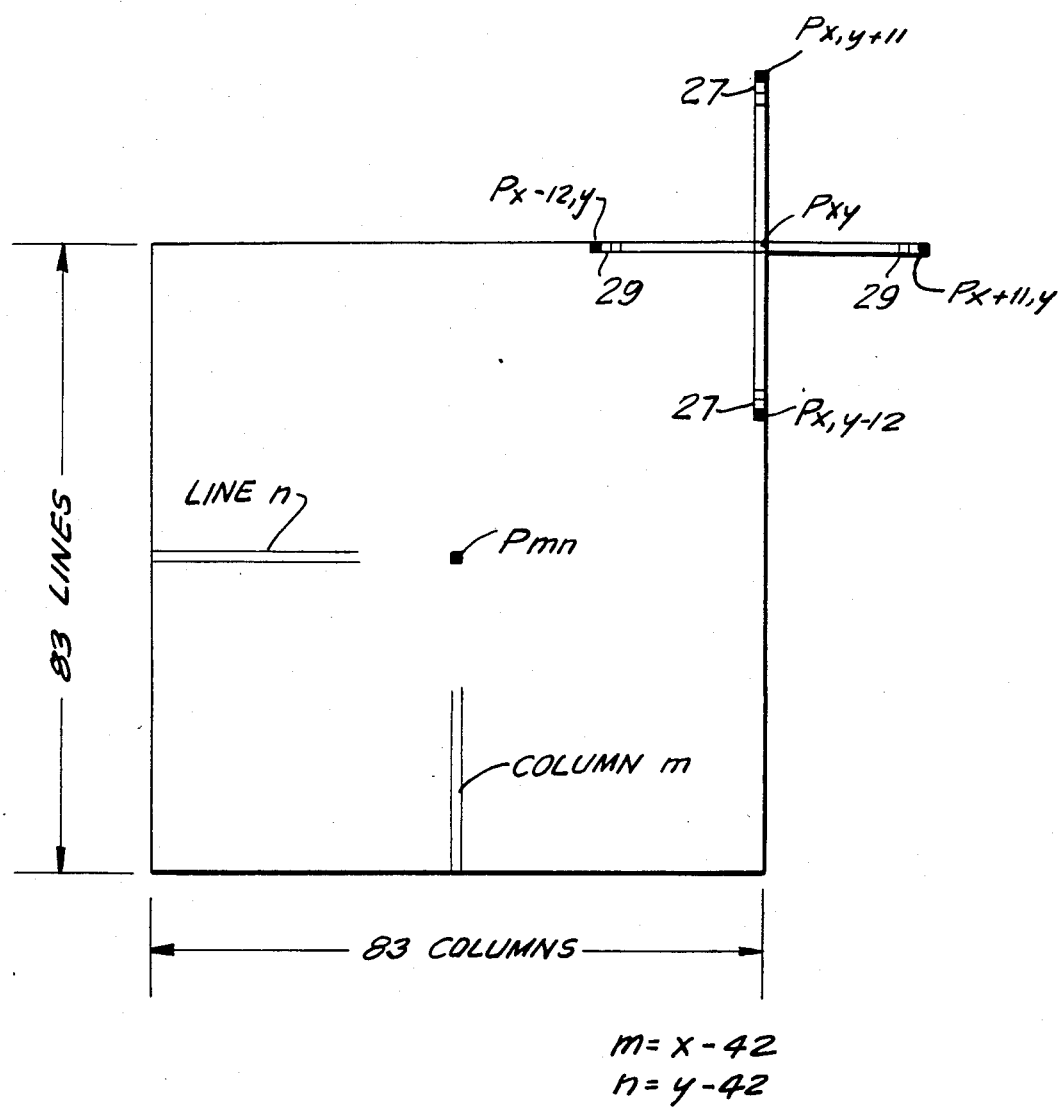
FIG. 3 is a schematic representation of the real time relationship between the pixel being scanned, the pixel Pxy whose gray scale value is being converted to binary values for the three intermediate binary images and the pixel Pmn whose binary value in the final binary image is being determined.

In the first embodiment illustrated in FIGS. 1 through 3, the vertical and horizontal processing involves vertical and horizontal slit window mini-fields 27 and 29 (see FIG. 3). Each slit window is a dual window having three pixels at each end of a twenty-four pixel slit that is substantially centered on the pixel Pxy. The three end pixels in each end of each slit are used to provide the average value against which the pixel Pxy is compared.

The analysis described herein is on a pixel by pixel basis. The pixel whose intermediate binary values are being determined is designated Pxy, indicating its position in the field of 1024×1024 pixels. The pixel whose ultimate binary value is being determined is designated Pmn in the field of pixels. Pxy and Pmn are designated differently only because in real time they differ in position in the image field. Each pixel Pxy becomes a pixel Pmn. The position of the mini-fields and subfields discussed herein are a function of the pixel being analyzed; the Pxy being substantially centered in the mini-field and Pmn being substantially centered in the subfield used for analysis of that Pmn.

In particular, with reference to FIG. 1, an appropriately modulated light beam 10 is incident on a array of charge couple devices (CCDs) 12 to provide an analog signal. A control circuit 14 is responsive to the average level of the output of the signal from the array 12 to control the intensity of the light source from which the modulated light beam 10 is derived. In this fashion, the input information signal to the system has an input that is centered within the operating range of the system.

Each device in the array 12 provides an analog signal that is converted to an eight bit gray scale signal by an analog to gray scale digital converter 16. In the fingerprint embodiment of this invention, the array 12 is a linear array of CCDs across which the modulated light beam 10 is scanned. During the optical scan, an electronic scan of the array is made to provide a series of output signals, each signal representing a picture element or pixel of the image. The image developed is a series of horizontal lines and vertical columns, with the optical scan being on a line by line basis.

The converter 16 converts each of these signals from an analog value to an eight bit gray scale value. Accordingly, the output of the converter 16 is a series of four bits to provide a sixteen level gray scale value for each pixel. For convenience, the value of each pixel Pxy will be referred to as the pixel itself.

Each pixel Pxy is applied to a RAM array 18 which stores the gray scale values for each pixel in the most recent twenty-four lines of the scan. A PROM 20 contains an address program which provides certain outputs from the RAM array 18 that are correlated to the pixel Pxy whose intermediate binary values are to be determined.

For each pixel Pxy, the RAM array 18 provides two outputs. One of these outputs is the gray scale value of the three pixels at each end of the twenty-four pixels in a vertical column within which Pxy is approximately centered. These six pixels, which constitute the vertical mini-field, are applied to a first adder and accumulator 22 whose output is supplied to a ROM 24 that divides the output by six thereby providing an average gray scale value for the vertical minifield.

The other output from the RAM 18 updates the twenty-four pixels in a horizontal line that are held in the shift register 25. Pxy is approximately centered in this horizontal line of twenty-four pixels. One output from the shift register 25 is the gray scale value of the three pixels at each end of the twenty-four pixels, which constitute the horizontal mini-field, are applied to a second adder and accumulator 26, whose output is supplied to a ROM 28 that divides the output by six thereby providing an average gray scale value for the horizontal mini-field.

To perform this function of providing the mini-fields in a predetermined association with each Pxy, the PROM 20 controls the addressing of the RAM 18. As each pixel in the most recent line of pixel gray scale signals are added to the RAM (and the pixel in the same column twenty-four pixels down is deleted), the PROM 20 causes the outputs from the RAM 18 to progress in step. This assures that the vertical mini-field output from the RAM 18 (as indicated in Note A in FIG. 1) is co-ordinated with the horizontal mini-field output from the shift register 25 (as indicated in Note C in FIG. 1). This co-ordination is illustrated in FIG. 3. Since the six pixel horizontal mini-field is provided by fixed outputs from the shift register 25, the RAM 18 output to the shift register 25 is the next pixel in the line of twenty-four when the six pixel values to the adder 22 are each shifted one pixel to the right.

It my be noted that at the start of a new line of scan, twenty-four pixel values must be provided to the RAM 18 and shift register 25 before a meaningful mini-field input to the adders 22 and 26 can be provided. The PROM 20 regulates that timing. The fact that the mini-field 27, 29 (See FIG. 3) span twenty-four pixels is part of the reason why there is a border zone in the input gray scale pixel image field that does not become part of the output binary image.

These two average mini-field outputs are applied to an adder and divide-by-two circuit 30 so that an average gray scale value for the twelve pixels which constitute the two orthogonal mini-fields is provided. In addition, the gray orscale value for the Pxy is provided by the shift register 25.

The gray scale value Pxy is compared against each of these three average values in the comparators 32, 34, and 36 respectively. Where the gray scale value of Pxy is equal to or greater than the gray scale value of the average to which it is being compared, the output from the comparator 32, 34, 36 is the binary value "1". If the Pxy value is less than the average value, the output from the comparator is the binary value "0". As a result, the output of the comparators 32, 34, and 36 are a series of binary values, one value for each pixel, thereby providing three binary images for the field.

Each of these three binary images can be considered as having being generated or processed by different filters and thus are labelled with the processing filter that has influenced the image. The average-twelve processed binary provides the reference image against which the other two are compared.

Both the vertical and horizontal mini-fields span twenty-four pixels each but only contain six outer pixels to harmonically enhance the process. The span approximates the expected average ridge to ridge spacing on the fingerprint image being analyzed. With this relationship in mind, it may be seen why the mini-fields are only the outer six pixels of the twenty-four pixel zone. The average value of the outer six pixels will distinguish over the Pxy value more sharply than will the average value of the entire twenty-four pixel zone (or any lesser or greater zone). For example, a Pxy centered in a ridge will be compared with three pixels on one side and three on the other side which will lie in valley regions. By omitting the intermediate pixels from the average, the difference is magnified. Specifically, if the difference between Pxy and the average of the mini-field is "Q" where the mini-field is the twenty-four pixels in the zone, then the difference will be greater than Q where the mini-field is the outer six pixels of that zone. This is most useful in providing an enhanced binary imaging process on conversion where the gray values of the ridge and valley are close in magnitude.

The vertical processed binary image is compared on a pixel by pixel basis with the reference binary image in an exclusive-nor circuit 38. The horizontal processed binary image is also compared on a pixel by pixel basis with the reference binary image in a second exclusive-nor circuit 40. In each exclusive-nor circuit, if the binary value for the corresponding pixels from the two images being compared is the same, then the output of the exclusive-nor circuit 38 or 40 is the binary value "one". If the binary value of the two corresponding pixels being compared is different, then the output from the exclusive-nor circuit 38 or 40 is a "zero". In this fashion, a series of correlations are developed.

FIG. 3 represents the relationship between the two mini-fields (each spanning 24 pixels) and the subfield which corresponds to 83×83 pixels. The binary value for the pixel Pxy in the three intermediate binary images must be determined in order to complete the correlation analysis for the 83×83 subfield. The correlation analysis for the 83×83 subfield provides a correlation value (V count from the buffer 42 and H count from the buffer 44) for the position Pmn at the center of the subfield. This correlation value is applied downstream of the buffers 42 and 44 to affect the binary value of the pixel Pmn which has the position in the video image that corresponds to the position Pmn in the correlation space defined in the buffers 42 and 44.

From FIG. 3 it can be seen that the intermediate binary values for the pixel Pxy (which is 42 pixels to the right and 42 pixels above the pixel Pmn) must be determined before the final value of the pixel Pmn can be determined. It should be recognized that in order to determine the intermediate binary values of the pixel Pxy, the scan has to have reached at least the position of the uppermost pixel in the vertical mini-field 27 namely the pixel Px, y+11. As a practical matter, there is likely to be some delay built into the system so that the actual scan will be a number of pixels to the right of that uppermost pixel.

The series of one and zero correlation counts out of the exclusive-nor circuits 38 and 40 are applied respectively to the correlation buffers 42 and 44 which are illustrated in greater detail in FIG. 2. The buffer 42 provides appropriate memory delay and windowing to permit producing an output that is a correlation count number. For an 83×83 pixel subfield around a pixel Pmn, this correlation number indicates how many pixels in the reference binary image have the same binary value as the corresponding pixel in the vertical processed binary image. The circuit 40 and buffer 44 perform the same function for a comparison of the images derived from the horizontal mini-field processing and the reference mini-field processing. Thus two counts are provided for each pixel in the image field. One such count is labelled a V count because it represents a correlation with the vertical slit window filter processing and the other output is labelled an H count because it represents a correlation with the horizontal slit window filter processing.

These two counts, for a pixel Pmn, are compared in a magnitude comparator 46 to provide one of three output signals. If the V count is greater than the H count, then a first output from the comparator 46 enables AND gate 48. If the V count is less than the H count, a second AND gate 50 is enabled. In the unusual case where V=H, an output enables AND gate 52. The other input to each of these AND gates is from a RAM store 54, 56 and 58 respectively representing binary image information derived respectively from the vertical slit filter, the horizontal slit filter and the reference filter.

More particularly, these RAM storage units 54, 56 and 58 hold the most recent forty-two lines of binary image for each of the three mini-field filters involved. The output from the comparator circuit 46 enables the appropriate AND gate to pass on to the microprocessor the binary value for that pixel Pxy from either (1) the image developed through the vertical average filter, or (2) the image developed through the horizontal filter or (3) in the default situation where V=H, the image developed through the reference filter. The image RAM storage units 54, 56 and 58 hold the binary values for each of the three images for the most recent forty-two lines of image so as to have available the appropriate binary value for transmission through the OR gate 60 to the microprocessor.

The output from the comparators 32, 34, 36 are the three video images indicated, each image in turn being constituted by a series of binary value pixels. The processing applied by the exclusive-nor gates 38, 40 and the correlation buffers 42, 44 is a correlation procedure in which a correlation value (the V count and the H count) is obtained. The V count indicates the degree of image correspondence between a predetermined area around a pixel in the second intermediate image and the corresponding area in the reference image. The H count provides the same correlation value for the same area in the first intermediate binary image compared against the corresponding area in the reference image. Both of these correlation counts, V and H, are obtained for each pixel in the image.

FIG. 3 is a schematic representation which can be interpreted in terms of correlation space as well as in term of image space. It aids in showing the relationship between the correlation space and image space.

The correlation buffer 42 performs its function in a two dimensional space substantially defined by the RAM units 42c and 42d (see FIG. 2). This RAM space will also be called the correlation space. It aids in understanding the relationship between correlation space and the two dimensional image that constitutes the video space to recognize that the x and y location address in correlation space corresponds to x and y location addresses in video image space. This correspondence means that the determination concerning a position Pmn in correlation space can be related to the corresponding pixel Pmn in video space. Thus the buffer 42 which provides a V count for the position Pmn can be used to determine which of the pixels Pmn in the storage units 54, 56 and 58 is to be sent on as the binary value for that pixel Pmn in the final image.

By referring to FIG. 3, it may be seen that the RAM 18 storage (see FIG. 1) must hold the most recent twenty-four lines of scan in order to encompass all of the pixels in the vertical mini-field 27. One of the twenty-four lines of scan will include the horizontal mini-field 29. Once the values of the Pxy have been determined for the intermediate binary images, those value are placed in the RAM units 54, 56 and 58. Each of these storage units must hold the most recent forty-two lines of intermediate binary image developed. This is because the area correlation value (V count and H count) requires individual pixel correlation values forty-two lines ahead of the position Pmn whose V count and H count are being determined.

It should be appreciated that the instantaneous scan will be at least eleven lines ahead of the forty-two lines held in storage because the gray values of the pixels must be developed that far ahead in order for the processing involving the vertical mini-field 27 to be undertaken.

The Correlation Buffer

FIG. 2 illustrates in greater detail the arrangement provided by the correlation buffer 42. Since the correlation buffer 44 is identical, only the buffer 42 need be shown.

With reference to FIG. 2, each output from the exclusive-nor gate 38 is provided to a shift register 42a to hold the correlation value (that is, the value "one" or "zero") for each of 83 pixels in a line. The arithmetic adder accumulator 42b provides a value that is the sum of the individual correlation values held in the shift register 42a. For each shift register 42a location, there is a corresponding location in RAM space and a corresponding pixel in video image space. This summation of a line of 83 correlation values thus has a value between "0" and "83" and this is the linear C.V. for the line of pixels that correspond to positions within the shift register. The linear C.V. is stored in the RAM location corresponding to the 83rd shift register location. That linear C.V. can be considered to be associated with the pixel Pmn at the center of the 83 pixels from which the 83 correlation values have been derived. At each increment of x in Pxy a new correlation value "0" or "1" is applied to the shift register 42a. The line of values shifts over by one and the new accumulated output which is provided by the adder 42b is associated with the pixel Pm+1,n. This new linear C.V. for Pm+1,n in the adder 42b is simply (a) the difference between the new individual C.V. and the C.V. being dropped, added to (b) the linear C.V. associated with Pmn.

The arithmetic adder accumulator 42b provides these linear C.V.'s to the memory unit RAM 42c. The memory 42c holds the linear C.V. associated with each position in the most recent 83 lines. This field of linear C.V.'s is approximately a thousand columns with 83 linear C.V.'s per column. Thus as the correlation storage process continues, the RAM 42c holds the linear C.V. for each position in 83 lines from the line "n−42" through the line "n+42". The linear C.V. for each position in eighty-three lines of scan must be held in the RAM space 42c because the area correlation count is for a field that has 83 columns as well as 83 lines.

Each column of eighty-three linear C.V.'s held in the RAM space 42c is summed to provide an area count value that is associated with the pixel Pmn. More precisely, the position Pmn which is associated with the linear C.V. at the center of the column is also associated with the area C.V. that results from summing the 83 linear C.V.'s that constitute the column. That position Pmn in correlation space corresponds to the pixel Pmn.

The RAM space 42d holds nearly one thousand area C.V.'s. As each new line of linear C.V.'s is provided at the RAM 42c, the linear C.V. at the bottom of the column is substracted from the most recent linear C.V. (that is, from the one being added to the column) to provide a new area C.V. The new area C.V. is associated with the position one line up, in the same column, from the position with which the now displaced area C.V. was associated.

More specifically, with reference to FIG. 2, when a linear C.V. for a position in column "x" is applied on line "a" to the correlation adder accumulator 42e, the linear C.V. in column "x" that is eighty-three lines down in the column "x" is applied on line "b" to adder 42e. The adder 42e subtracts the value on line "b" from the value on line "a" and adds the difference to the area C.V. value received on line "c". The value on line "c" is the area C.V. value held in the RAM space 42d for the position in column "x" that is one line below the position whose area count is being determined. That area count output (the V count for Pmn) is also applied to the RAM space 42d to replace the immediately preceding area C.V. in column "x". In this fashion only one "line" of area CV values needs to be held in the RAM space 42d.

An Alternate Reference Image

Certain significant variations that could be made in the above embodiment should be noted. For example the reference intermediate binary image (held in RAM 58) can be derived in a number of ways. Another way is to take (a) the absolute value of the difference between the average gray value of the horizontal (first) mini-field and the gray value of the pixel Pxy and to also take (b) the absolute value of the difference between the average gray value under the vertical (second) mini-field and the gray value of the pixel Pxy. These two absolute values are compared. If the first absolute value is greater than the second absolute value, that suggests the horizontal mini-field may provide better distinction than the vertical mini-field and thus the binary value assigned to the corresponding pixel Pxy in the reference image is the value of that pixel Pxy in the intermediate image derived from the horizontal mini-field filter.

Similarly, if the absolute value of the second difference is greater than the absolute value of the first difference, then the corresponding pixel in the reference binary image is given the value of that pixel in the vertical intermediate binary image. If the two absolute values are the same, the value "one" (or "zero") can be assigned arbitrarily to that pixel in the reference binary image.

The important point to keep in mind is that the reference binary image has an acuity with respect to local ridge direction that is intermediate between the directional acuity provided by said first and second intermediate binary image in the same locality.

Figure 4:
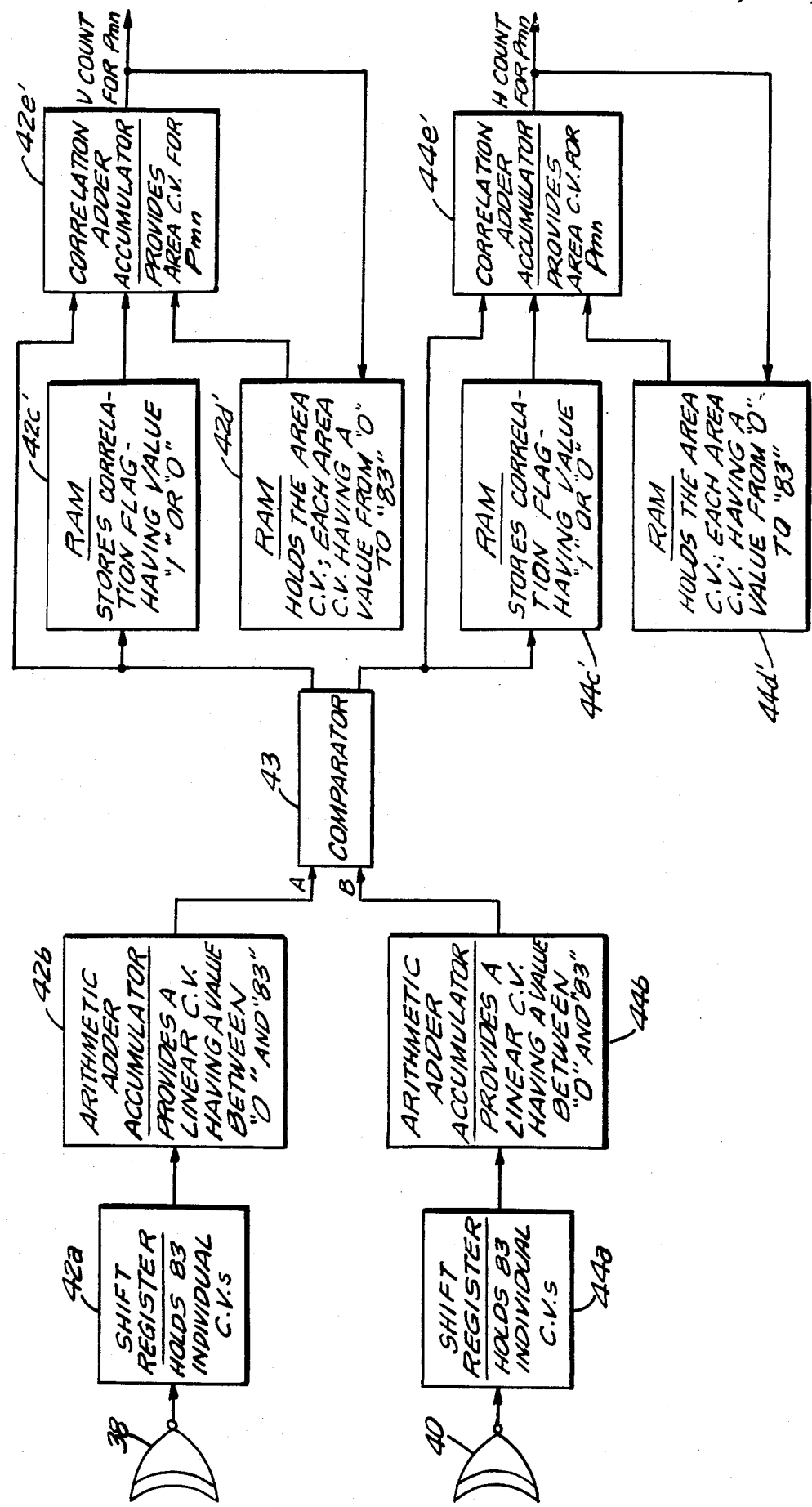
FIG. 4 is a block diagram illustrating an alternate mode of obtaining the linear and area correlation counts.

An Alternate Correlation Buffer (FIG. 4)

Another modification is illustrated in FIG. 4. To save on the storage space required in the correlation buffers 42 and 44, an alternate correlation procedure can be employed. This modified procedure shown in FIG. 4 should be compared with the showing in FIG. 2.

The exclusive-nor gates 38 and 40 provide the same output, individual pixel correlation values, as in the embodiment shown in FIGS. 1 and 2. The shift registers 42a and 44a provide the same function of holding the individual values for each of of 83 pixels in a line. The arithmetic adder accumulators 42b and 44b have the same function of providing the linear correlation value associated with each pixel position in correlation space.

By contrast with FIG. 2, the linear correlation values (the outputs A and B from the adders 42b and 44b) are compared in value by a comparator 43. It should be kept in mind that each of these linear count values A and B has a value between "0" and "83". If the linear correlation value A, from the adder 42b, is greater than the linear correlation value B, from the adder 44b, then the comparator 43 provides an output binary value "one" to RAM storage unit 42c' and a value "zero" to the RAM storage unit 44c'. Similarly if value B is greater than A, the value "one" is applied to the RAM 44c' and the value "zero" is applied to the RAM 42c'. If A and B are equal, then the value provided to both RAM units 42c' and 44c' is "one". In this fashion, corresponding linear C.V.'s from the first (vertical) and second (horizontal) binary images are compared and the one having the greater correlation value is given an effective value "one" while the corresponding other linear C.V. is given an effective value "zero". These values "1" or "0" may be termed the correlation flog for a particular line in the correlation buffer. This correlation flog for a line is stored in RAM space 42c', 44c at the location corresponding to where the linear C.V. for that line would be stored in the FIG. 2 embodiment. Thus, the RAM 42c' (and RAM 44c') only must hold the value "1" or "0" instead of the linear C.V. in the same RAM location that would have held the linear C.V. This contrasts with the RAM 42c in the FIG. 2 embodiment which holds a linear C.V. value from "0" to "83" for each linear C.V. RAM location. The RAM 42d then only has to hold area CV values between "0" and "83" for each column in correlation space. Similarly the correlation adder accumulatory 42e only has to provide an area count value that is no greater than "83". This is a method of approximating the correlation buffer function, by making a line by line comparison instead of basing the area correlation on a pixel by pixel basis.

With both the FIGS. 2 and 4 correlation buffers in mind, it may be seen that the important function for these buffers is to provide first and second correlation values. The first correlation value is a measure of the conformance between (a) the pattern of pixels in the subfield in the first binary image, and (b) the pattern of pixels in the corresponding subfield in the reference binary image. The second correlation value is a measure of the conformance between (a) the pattern of pixels in the subfield in the second binary image and (b) the pattern of pixels in the corresponding subfield in the reference binary image. Both of these area correlation values are associated with a predetermined pixel that has a predetermined position in association with the subfield involved. These correlations are then compared (in the comparator 46) to provide the basis for determining whether the binary value from the first or from the second intermediate binary image is to be used for that pixel in the final or fourth intermediate binary image. It should be kept in mind that the binary value for the pixel in the reference binary image is only employed in the default case where the two area correlation values are equal.

Thus, the V count for the pixel under consideration Pmn will be between "0" and "83" and similarly the H count for that pixel Pmn will be between "0" and "83". These two outputs V and H are compared by the comparator 46, shown in FIG. 1, with the same downstream processing as described in connection with the FIG. 1 embodiment.

Figure 5:
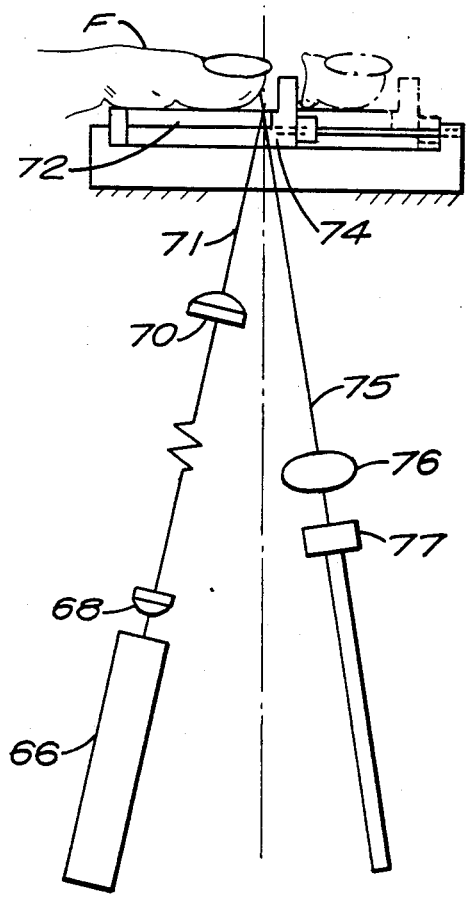
FIGS. 5 and 6 illustrate one optical scanning technique which may be used with the FIG. 1 conversion apparatus.
Figure 6:
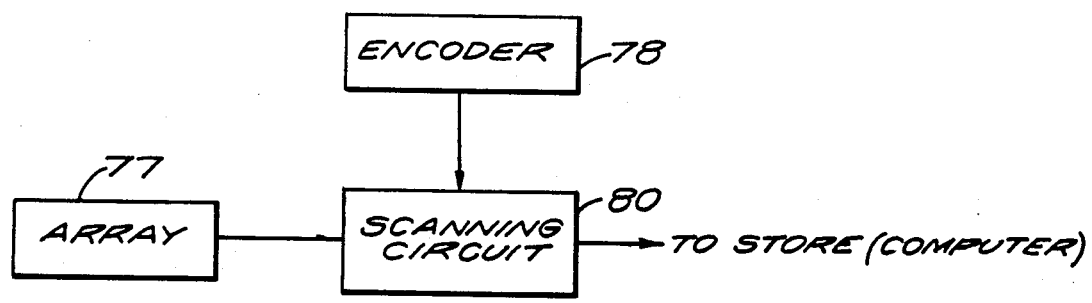

FIGS. 5 and 6 indicate a known mechanism for optically scanning the fingerpirnt to provide the modulated light beam 10 input to the CCD array 12. Since it is described in the issued U.S. Pat. No. 4,322,163, the disclosure herein need not be in great detail. Suffice it, therefore, to say that a beam of light such as may be provided by a laser 66 is appropriately collimated by lenses 68 and 70 to provide the interrogating beam 71. A substantially transparent platen 62 is provided as a base on which an individual finger F may be placed. The platen 72 is mounted in a movable carriage 74 which permits moving the finger across the interrogating beam 71. As a consequence, the pattern of ridges and valleys provided at the back surface of the platen 72 causes the reflected light beam 75 to be modulated with fingerprint information. A focusing lens 76 focuses the image carried by the reflected light beam onto a linear array 77 of photo responsive diodes.

An encoder element 78 which is affixed to the carriage 74 responds to movement of carriage 76 to produce a synchronizing signal each time the carriage moves a predetermined distance. The synchronizing signal causes the scanning circuit 80 to sequentially interrogate each of the photodiodes comprising the array 77. Thus the output of the scanning circuit 80 is a train of pulses for each scan line. Each pulse represents a picture element or pixel.

It should be kept in mind that the scanning mechanism of FIGS. 5 and 6 is but one example of the finger scanning techniques with which the conversion device of this invention may be used.

What is claimed is:

1. The method of providing a fingerprint image represented by a field of binary pixels comprising the steps of:
   a. optically imaging a finger surface or a continuous fingerprint to provide an input gray scale image of said fingerprint, said input image being a field of gray scale pixels,
   b. generating a first intermediate binary image using a first elongate mini-field by the method comprising the steps of: for each pixel in said gray scale image, positioning said first elongate mini-field in a predetermined association with said pixel, comparing an average gray scale value of said mini-field with the gray scale value of said pixel, and assigning a binary value to a corresponding pixel of said first intermediate binary image, said binary value being a function of the relative values of said average gray scale value and said pixel gray scale value,
   c. generating a second intermediate binary image using a second elongate mini-field, the elongate axes of said first and second elongate mini-fields being at substantial angles to one another, by the method comprising the steps of: for each pixel in said gray scale image, positioning said second elongate mini-field in a predetermined association with said pixel, comparing an average gray scale value of said mini-field with the gray scale value of said pixel, and assigning a binary value to a corresponding pixel of said second intermediate binary image, said binary value being a function of the relative values of said average gray scale value and said pixel gray scale value,
   d. generating a reference intermediate binary image, said reference intermediate binary image having directional acuity in any given locality that is intermediate between the directional acuity of said first and second binary images in said given locality,
   e. associating each pixel of each of said three intermediate binary images with a predetermined subfield to establish first and second correlation values respectively, said first correlation value indicating correlation between the pixels in said subfield in said first binary image and the pixels in said subfield in said reference binary image, said second correlation value indicating correlation between the pixels in said subfield in said second binary image and said pixels in said subfield in said reference binary image, and
   f. assigning a binary value to each pixel in a fourth binary image, said binary value in said fourth image being the binary value for the corresponding pixel from the one of said first or second intermediate binary images whose correlation value indicates the greater correlation.

2. The method of claim 1 wherein:
said first and second mini-fields are the outer ends of first and second elongate zones respectively, the center portions of said first and second elongate zones being omitted from said first and second mini-fields respectively.

3. The method of claim 2 wherein:
the length of each of said elongate zones is approximately the average ridge to ridge spacing of a fingerprint image represented by said gray scale image.

4. The method of claims 1, 2 or 3 wherein:
said elongate axes of said first and second elongate mini-fields are substantially perpendicular to one another.

5. The method of claims 1, 2 or 3 wherein:
said first and second correlation values are a count of the number of pixels in said subfield of said first and second binary images respectively that have the same binary value as the pixel in said reference binary image which corresponds to the pixels from said first and second binary images for which said subfield correlation values are established, thereby establishing first and second binary value counts associated respectively with corresponding pixels from said first and second intermediate binary images, and said step of assigning a binary value to pixels in said fourth binary image employs the higher one of said binary value counts as indicating the greater correlation.

6. The method of claim 5 wherein:
said elongate axes of said first and second elongate mini-fields are substantially perpendicular to one another, one of said axes being parallel to a line of said field of pixels and the other of said axes being parallel to a column of said field of pixels.

7. The method of claim 4 wherein:
said pixel associated with each of said mini-fields is substantially centered in the corresponding one of said mini-fields, and said pixel associated with said subfield is substantially centered in said subfield.

8. The method of claim 4 wherein:
a reference mini-field consists substantially of the zone defined by said first elongate mini-field and the zone defined by said second elongate mini-fields.

9. The method of claims 1, 2 or 3 wherein:
said first correlation value is a count of the number of lines of said subfield in said first binary image which have a larger number of individual pixel binary value correlations with corresponding pixels from said reference binary image than do corresponding lines from second binary image, and said second correlation value is a count of the number of lines of said subfield in the second binary image which have a larger number of individual pixel binary value correlation with corresponding pixels from said reference binary image than do corresponding lines from said first binary image, and
said step of assigning a binary value for pixels in said fourth binary image employs the higher correlation line count as the indicator of greater correlation.

10. A system for providing an image represented by a field of binary pixels comprising:
 a. an optical imaging means to provide an input gray scale image of an object, said input image represented by a field of gray scale pixels,
 b. means to generate and scan first, second and reference predetermined mini-fields respectively across said gray scale input image, said first and second mini-fields being substantially elongate and having their elongate axes at substantial angles to one another, said reference mini-field including areas of both of said first and second mini-fields,
 c. means to position said first, second and reference mini-fields over each pixel in turn, to compare the gray scale value for a given pixel with an average gray scale value of the mini-field positioned over said given pixel and to assign a binary value to each pixel in first, second and reference intermediate binary images respectively based on that comparison,
 d. means to associate each pixel of each of said three intermediate binary images with a predetermined subfield to establish first and second correlation values respectively, said first correlation value indicating correlation between the pixels in said subfield in said first binary image and the pixels in said subfield in said reference binary image, and second correlation value indicating correlation between the pixels in said subfield in said second binary imnage and said pixels in said subfield in said reference binary image, and
 e. means to assign a binary value to each pixel in a fourth binary image, said binary value in said fourth image being the binary value for the corresponding pixel from the one of said first or second intermediate binary images whose correlation value indicates the greater correlation.

11. The system of claim 10 wherein:
said first and second mini-fields are the outer ends of first and second elongate zones respectively, the center portion of said first and second elongate zones being omitted from said first and second mini-fields respectively.

12. The system of claim 11 wherein:
the length of each of said elongate zones is approximately the average ridge to ridge spacing of a fingerprint image represented by said gray scale image.

13. The system of claims 10, 11 or 12 wherein:
said elongate axes of said first and second elongate mini-fields are substantially perpendicular to one another.

14. The system of claim 10, 11 or 12 wherein:
said first and second correlation values are a count of the number of pixels in said subfield of said first and second binary images respectively that have the same binary value as the pixel in said reference binary image which corresponds to the pixels from said first and second binary images for which said subfield correlation values are established, thereby establishing first and second binary value counts associated respectively with corresponding pixels from said first and second intermediate binary images, and
said step of assigning a binary value to pixels in said fourth binary image employs the higher one of said binary value counts as indicating the greater correlation.

15. The system of claim 14 wherein:.
said elongate axes of said first and second elongate mini-fields are substantially perpendicular to one another, one of said axes being parallel to a line of said field of pixels and the other of said axes being parallel to a column of said field of pixels.

16. The system of claim 13 wherein:
said pixel associated with each of said mini-fields is substantially centered in the corresponding one of said mini-fields,
said pixel associated with said subfield is substantially centered in said subfield.

17. The system of claim 13 wherein:
a reference mini-field consists substantially of the zone defined by said first elongate mini-field and the zone defined by said second elongate mini-field.

18. The system of claims 10, 11 or 12 wherein:
said first correlation value is a count of the number of lines of said subfield in said first binary image which have a larger number of individual pixel binary value correlations with corresponding pixels from said reference binary image than do corresponding lines from said second binary image, and said second correlation value is a count of the number of lines of said subfield in said second binary image which have a larger number of individual pixel binary value correlations with corresponding pixels from said reference binary image than do corresponding lines from said first binary image, and
said step of assigning a binary value for pixels in said fourth binary image employs the higher correlation line count as the indicator of greater correlation.

19. The method of providing an image represented by a field of binary pixels comprising:
optically imaging a gray scale image comprising a field of pixels having values in a gray scale,
for a pixel of interest from said gray scale field, determining the local direction at said pixel of interest of the image represented by said field of pixels,
selecting an elongate mini-field having an elongate axis substantially orthogonal to said local direction, said mini-field being associated with said pixel of interest, determining the average gray scale value of said elongate mini-field, comparing said average gray scale value of said elongate mini-field with the gray scale value of said pixel of interest, assigning to said pixel of interest, a binary value that is determined by the relative magnitudes of said average gray scale value of said mini-field and said gray scale value of said pixel of interest, and repeating said steps of determining, selecting, determining comparing and assigning for each pixel of interest in said field.

20. A system for providing an image represented by a field of binary pixels comprising:

an optical imaging means to provide an input gray scale image of an object, said input image represented by a field of gray scale pixels, means to generate and scan first, second and reference predetermined mini-fields respectively across said gray scale input image, said first and second mini-fields being substantially elongate and having their major axes substantially orthogonal to one another, said third mini-field including areas of both of said first and second mini-fields, means to position said first, second and third mini-fields over each pixel in turn, to compare the gray scale value for a given pixel with an average gray scale value of the pixels within the mini-field positioned over said given pixel and to assign a binary value to each pixel in first, second and reference intermediate binary images respectively based on that comparison, means to position each pixel of each of said three intermediate binary images within a predetermined subfield, said pixel being located substantially in the center of said subfield to establish first and second counts associated with said pixel of the number of pixels within the subfield from said first and second intermediate binary images respectively that have the same binary value as the corresponding pixel in said reference binary image, and means to assign a binary value to each pixel in a fourth binary image, said binary value in said fourth image being the binary value for the corresponding pixel from the one of said first or second intermediate binary images whose count is greater.

21. A system for providing an image represented by a field of binary pixels comprising:

an optical imaging means to provide an input gray scale image of an object, said input image represented by a field of gray scale pixels, means to generate and scan at least first and second predetermined mini-fields respectively across said input gray scale image, said first and second mini-fields being substantially elongate and having their elongate axes at substantial angles to one another, means to position said first and second mini-fields in association with each pixel in turn, to compare the gray scale value for a given pixel with an average gray scale value of the pixels within the associated mini-field to assign a binary value to each pixel in first and second intermediate binary images respectively based on that comparison, means to provide a reference intermediate binary image having directional acuity in any given locality that is intermediate between the directional acuity of said first and second binary images in that locality, means to associate each pixel of each of said three intermediate binary images with a predetermined subfield to establish first and second correlation values respectively, said first correlation value indicating correlation between the pixels in said subfield in said first binary image and the pixels in said subfield in said reference binary image, said second correlation value indicating correlation between the pixels in said subfield in said second binary image and said pixels in said subfield in said reference binary image, and means to assign a binary value to each pixel in a fourth binary image, said binary value in said fourth image being the binary value for the corresponding pixel from the one of said first or second intermediate binary images whose correlation value indicates the greater correlation.

* * * * *